United States Patent
Saimani et al.

(10) Patent No.: US 12,118,011 B2
(45) Date of Patent: *Oct. 15, 2024

(54) UNIVERSAL REPORT ENGINE

(71) Applicant: Intuit Inc., Mountain View, CA (US)

(72) Inventors: Jayanth Saimani, Bangalore (IN); Ajay Karthik Nama Nagaraj, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,445

(22) Filed: May 22, 2023

(65) Prior Publication Data

US 2023/0289359 A1 Sep. 14, 2023

Related U.S. Application Data

(63) Continuation of application No. 17/139,659, filed on Dec. 31, 2020, now Pat. No. 11,698,912.

(51) Int. Cl.
  *G06F 16/00* (2019.01)
  *G06F 16/22* (2019.01)
  *G06F 16/245* (2019.01)
  *G06F 16/248* (2019.01)

(52) U.S. Cl.
  CPC ........ *G06F 16/248* (2019.01); *G06F 16/2246* (2019.01); *G06F 16/245* (2019.01)

(58) Field of Classification Search
  CPC ... G06F 16/248; G06F 16/245; G06F 16/2246
  USPC ................................................ 707/600–899
  See application file for complete search history.

(56) References Cited

U.S. PATENT DOCUMENTS

| | | | |
|---|---|---|---|
| 7,698,349 B2 | 4/2010 | Hulen | |
| 10,262,287 B2* | 4/2019 | Aneja | G06Q 10/06393 |
| 10,503,784 B1 | 12/2019 | Dean | |
| 2008/0294596 A1 | 11/2008 | Xiong | |
| 2011/0004612 A1 | 1/2011 | Boyersmith | |
| 2011/0119288 A1 | 5/2011 | Sinha | |
| 2014/0278813 A1* | 9/2014 | Grosset | G06Q 10/0637 |
| | | | 705/7.36 |
| 2015/0269254 A1 | 9/2015 | Jiang | |
| 2018/0246915 A1 | 8/2018 | Singh | |
| 2019/0026386 A1 | 1/2019 | McWaters | |

(Continued)

*Primary Examiner* — Michelle N Owyang
(74) *Attorney, Agent, or Firm* — Lathrop GPM LLP

(57) ABSTRACT

A method including receiving a first command including both a data extraction expression and a first report configuration expression. The data extraction expression includes program code for extracting fields of a dataset of a data source. The first report configuration expression includes program code configured to populate cells of first dimensions of a first report and to generate a first tree including subset nodes including records of the dataset. The first command is executed by executing the data extraction expression on the dataset to generate the records. Executing the first command also includes executing the first report configuration expression on the records to generate the first tree. Executing the first command also includes populating, using the first report configuration expression and the first tree, the cells. Executing the first command also includes generating, in response to receiving the first command and by traversing the first tree, the first report.

20 Claims, 8 Drawing Sheets

(56) References Cited

U.S. PATENT DOCUMENTS

2020/0293962 A1    3/2020  Herman
2021/0232615 A1*  7/2021  Hoffmann ............... G06F 40/30

* cited by examiner

Income Data Set

| TXN_ID | DATE | ACCOUNT_NAME | CUSTOMER_NAME | AMOUNT |
|---|---|---|---|---|
| 1 | 4/22/2019 | Stationaries | Alex | 100 |
| 2 | 4/22/2019 | Stationaries | Bill | 500 |
| 3 | 4/23/2019 | Stationaries | Alex | 1000 |
| 4 | 4/24/2019 | Stationaries | Mary | 850 |
| 5 | 4/25/2019 | Bags | Alex | 200 |
| 6 | 4/26/2019 | Bags | Mac | 400 |
| 7 | 4/27/2019 | Bags | John | 10000 |
| 8 | 4/28/2019 | Bags | Jack | 925 |

DSL Attributes

| Fields | | |
|---|---|---|
| Group1 | Amount | AccountName |
| Category1 | Categorize by AccountName | |
| | Generated = true | |
| DSL | Account Summary DSL | |

400 — 402

Account Summary Report

| Dimension | Group | Fields |
|---|---|---|
| | Category | Amount |
| | Stationaries | 2450 |
| | Bags | 11525 |

```
{                                          ⟵ 700
   "dataSources": [..],
   "dataSets": [..],
   "fields": [..],
   "dimensions": [                         ⟵ 702
      {
         "id": "TxnDimension",
         "groups": [
            {
               "id": "TxnTypeGroup",
               "categories": [
                  {
                     "id": "TxnTypeCategory",
                     "groupKeyExpression": {
                        "expression": "$TxnList.TxnType"
                     },
                     "overriddenFields": [
                        {
                           "name": "Amount",
                           "value": "agg($SELF.CHILDREN.Amount, 'SUM')"
                        }                  ⟵ 704
                     ]
                  }
               ]
            },
            {
               "id": "CustomerGroup",
               "categories": [
                  {
                     "id": "CustomerCategory",
                     "groupKeyExpression": {
                        "expression": "$TxnList.Customer"
                     }                     }
                  ]
         }]}]}                              ⟵ 702
```

| TXN ID | DATE | TxnType | Customer | AMOUNT... |
|---|---|---|---|---|
| 1 | 4/22/2019 | Income | Alex | 100 |
| 2 | 4/22/2019 | Expense | Sam | 500 |
| 3 | 4/23/2019 | Income | Brad | 1000 |
| 4 | 4/24/2019 | Income | Brad | 850 |
| 5 | 4/25/2019 | Income | Smith | 200 |
| 6 | 4/26/2019 | Expense | Alex | 400 |
| 7 | 4/27/2019 | Expense | Sam | 10000 |
| 8 | 4/28/2019 | Expense | Brad | 925 |

| TxnType | Customer | AMOUNT |
|---|---|---|
| Income Amount=2 150 | Alex | 100 |
| | Brad | 1850 |
| | Smith | 200 |
| Expense Amount=1 1825 | Alex | 400 |
| | Sam | 10500 |
| | Brad | 925 |

*FIG. 7B*

PROFIT AND LOSS
August 1 - October 22, 2020   *— 800*

|  | TOTAL |
|---|---|
| ⌄ Revenue |  |
|     Billable Expense Income | 32,323.00 |
|     Discounts given | 34.00 |
|     Sales | 120.00 |
|     Sales of Product Income | 123.00 |
| Total Revenue | $32,532.00 |
| ⌄ Cost of Sales |  |
|     Cost of Goods Sold | 0.00 |
| Total Cost of Sales | $0.00 |
| Profit | $32,532.00 |
| ⌄ Expenses |  |
|     Advertising & Marketing | 434.00 |
| Total Expenses | $434.00 |
| NET OPERATING INCOME | $32,098.00 |
| ⌄ My money!! |  |
|     Late Fee Income | 1,621.08 |
| Total My money!! | $1,621.08 |
| ⌄ Other Expenses |  |
|     Unrealized Gain or Loss | 0.00 |
| Total Other Expenses | $0.00 |
| NET OTHER INCOME | $1,621.08 |
| NET INCOME | $33,719.08 |

*FIG. 8*

UNIVERSAL REPORT ENGINE

RELATED APPLICATIONS

This application is a continuation application of U.S. application Ser. No. 17/139,659, filed Dec. 31, 2020, the entirety of which is hereby incorporated by reference in its entirety.

BACKGROUND

Computers are used to display reports of data. However, automatically generating a report customized to a user's desired style, without programming code provided by the user, is difficult.

SUMMARY

One or more embodiments include a method. The method includes receiving a first command including both a data extraction expression and a first report configuration expression. The data extraction expression includes program code for extracting fields of a dataset of a data source. The first report configuration expression includes program code configured to populate cells of first dimensions of a first report and to generate a first tree including subset nodes including records of the dataset. The method also includes executing the first command by executing the data extraction expression on the dataset to generate the records. Executing the first command also includes executing the first report configuration expression on the records to generate the first tree. Executing the first command also includes populating, using the first report configuration expression and the first tree, the cells. Executing the first command also includes generating, in response to receiving the first command and by traversing the first tree, the first report.

The one or more embodiments also include a data structure. The data structure includes a dataset including records, and a command. The command includes a data extraction expression applicable to fields of a dataset of a data source. The command also includes a first report configuration expression applicable to first dimensions of a first report. The data structure also includes a first tree including a root node and first nodes extended from the root node and corresponding to first subsets of the records. The root node corresponds to the records of the dataset. The first subsets are generated by executing a data extraction expression applied to fields of the dataset. The data structure also includes first populated dimensions generated by populating, using the first report configuration expression and the first tree, first cells of first dimensions defined by the first report configuration expression. The data structure also includes a first report including the first populated dimensions generated in response to receiving the command and by traversing the first tree.

The one or more embodiments also includes a non-transitory computer readable storage medium storing program code which, when executed by a processor, performs a computer-implemented algorithm. The computer-implemented algorithm includes receiving a first command including both a data extraction expression and a first report configuration expression. The data extraction expression includes program code for extracting fields of a dataset of a data source. The first report configuration expression includes program code configured to populate cells of first dimensions of a first report and to generate a first tree including subset nodes including records of the dataset. The computer-implemented algorithm also includes executing the first command by executing the data extraction expression on the dataset to generate the records. Executing the first command also includes executing the first report configuration expression on the records to generate the first tree. Executing the first command also includes populating, using the first report configuration expression and the first tree, the cells. Executing the first command also includes generating, in response to receiving the first command and by traversing the first tree, the first report.

Other aspects of the one or more embodiments will be apparent from the following description and the appended claims.

BRIEF DESCRIPTION OF DRAWINGS

FIG. 3, FIG. 4, FIG. 5, FIG. 6, FIG. 7A, FIG. 7B and FIG. 8 show a specific example of automatically generating a report, in accordance with one or more embodiments.

DETAILED DESCRIPTION

Figure 1:
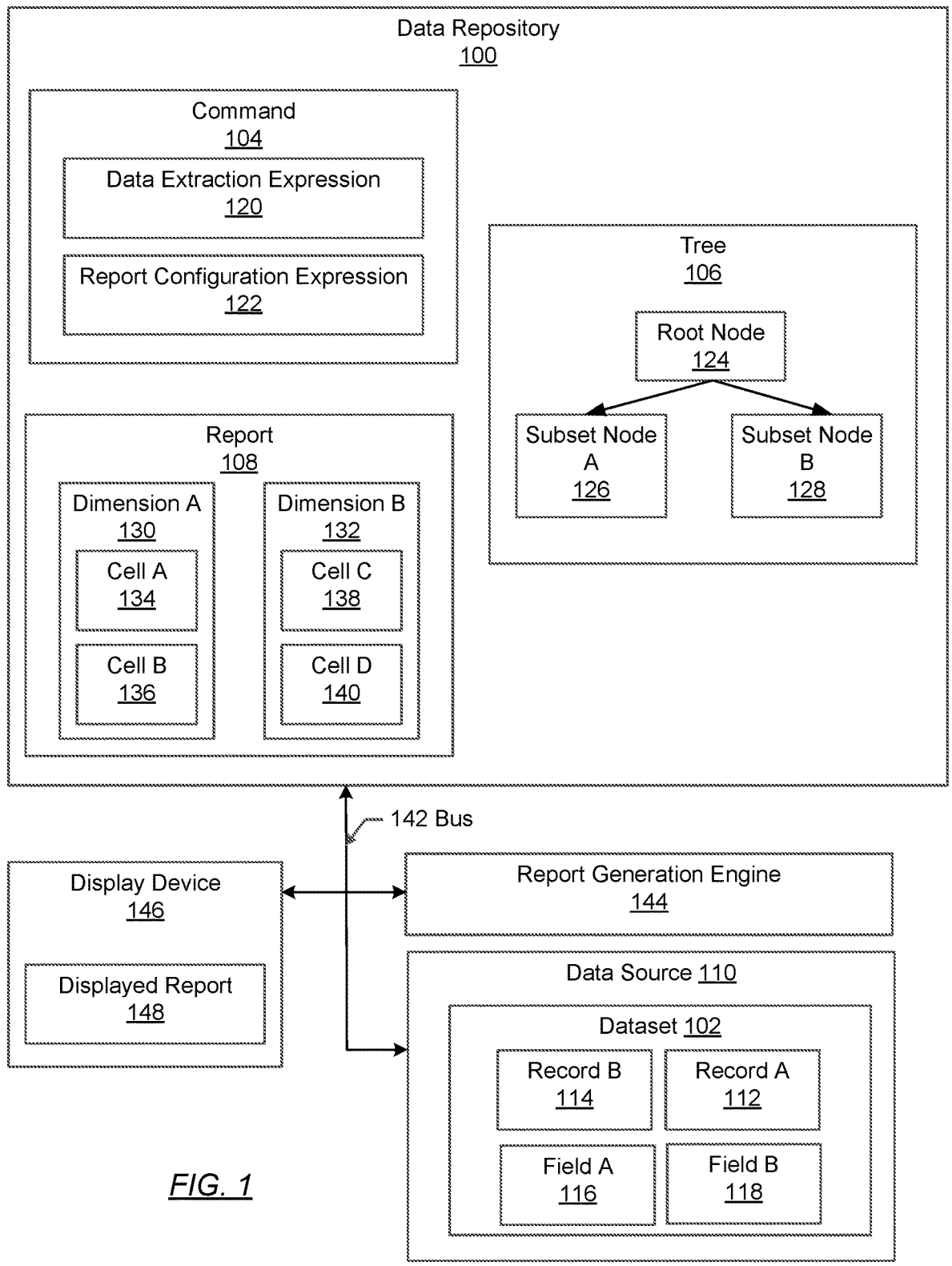
FIG. 1 shows a system diagram, in accordance with one or more embodiments of the one or more embodiments.

The specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the one or more embodiments related to automatic generation of reports. The one or more embodiments are specifically useful for automatically generating reports, customized by a user, without programming being provided by the user.

In particular, the one or more embodiments relate to a domain-specific language (DSL) for generating a platform-independent report using the desired data from a source data. In addition, the DSL may be used to embed report configuration instructions in a nested bracket structure. Thus, the DSL may be used to designate what a report on source data contains, as well as how the report is to be structured.

In use, a user may select a widget on a graphical user interface (GUI) asking for a particular kind of report. The underlying software can then build the report with a hierarchy not possible with a standard Structured Query Language (SQL).

Thus, the DSL not only allows for the efficient creation of reports, but also provides for a method of transforming data in one data structure (the source data) into another data structure (the report). The DSL is platform independent, and thus may be executed either client-side or server side.

The one or more embodiments also relate to a method for dynamically manipulating how a dataset will be parsed into subsets of records. A defined command in the DSL, described further below, can be used to supply a needed hierarchy that is otherwise impossible to provide from a dataset configured for use with SQL. Stated differently, data stored or referenced using SQL does not have a hierarchy and thus is not suitable for dynamically constructing a custom report specified. Without the hierarchy in the static data, the custom report requires the user to have the programming skill to program the desired report structure.

However, the one or more embodiments can construct subsets of records by dividing via a data extraction expression. The results of one or more queries are placed into the subsets of records. The result is a tree of subsets of records that provides the hierarchy needed to generate a custom report structure designated by the user. In this manner, a user is able to generate a custom report structure without having the skill needed to program the computer to provide the custom report. The commands of the DSL, together with the procedures described herein, provide the mechanism and programming for creating the tree of subsets of the reports using one or more queries, without the user providing any programming to the computer.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores electronic data. In particular, the data repository (100) stores data (sometimes in the form of a data structure) that includes a command (104), a tree (106), and a report (108). The details of the contents of the data repository (100), in one or more embodiments, are described below.

The data repository (100) also includes a command (104). The command (104) is defined as a one or more expressions that, when read by the processor, are executable to carry out an electronic change to the computer. For example, a command may be an expression of computer program code that, when executed, performs a specific task with respect to the computer.

For the purposes of the one or more embodiments, the command (104) includes a data extraction expression (120) and a report configuration expression (122). The data extraction expression (120) is defined as program code which, when executed by the processor, extracts data. As described further below with respect to FIG. 2, the data extraction expression (120) is applied to the Field A (116) and the Field B (118) to extract data.

In turn, the report configuration expression (122) is defined as program code which, when executed by the processor, that populates cells of dimensions of a report defined by the report configuration expression. The "cells", "dimensions," and "report" are defined further below. Stated differently, the report configuration expression (122) is program code which can be used to configure which information from the Field A (116) and the Field B (118) is stored in which cells or dimensions of the final report. Stated differently still, the report configuration expression (122) is program code which specifies the configuration of the report.

The data repository (100) also includes a tree (106). The tree (106) is defined as a type of data structure that has specified relationships between the data that branch out from one another. The elements of the tree (106) are all nodes. Each subset node corresponds to a subset of records. The root node (124) includes all the records. More specifically, the tree (106) includes a root node (124) and possibly one or more sub-nodes, which in the one or more embodiments are referred-to as subsets (e.g., Subset Node A (126) and Subset Node B (128)). Each of the Subset Node A (126) and the Subset Node B (128) are distinct from each other, but they are both specified as having a relationship to the root node (124). Additional sub-nodes may be present which branch out from the Subset Node A (126) and/or the Subset Node B (128), and/or the root node (124).

The root node (124) is defined as the node to which all other sub-nodes in the tree (106) are related, at least indirectly. Thus, for example, the root node (124) could be characterized as a different subset that is related to the Subset Node A (126), the Subset Node B (128), and all other subsets that could exist within the root node (124). If another, different, root node were present, then a second tree would be present in the data repository (100).

In the one or more embodiments, the root node (124) corresponds to the Record A (112) and the Record B (114). Thus, the root node (124) corresponds to the records that exist in the dataset (102).

The Subset Node A (126) and the Subset Node B (128), in turn are defined as portions (e.g. buckets) of information that are extracted from the Field A (116) and the Field B (118) of the Record A (112) and/or the Record B (114). Stated differently, the subsets are information extracted from the fields of the dataset (102).

The data structure also includes a report (108). The report (108) is defined as an electronic data structure which defines the relationships among data. In other words, the report (108) is the dataset (102), but now re-arranged, summarized, etc., according to the commands expressed in the report configuration expression (122).

The report (108) is characterized by one or more dimensions, such as Dimension A (130) and Dimension B (132). A dimension is defined as a program code that specifies the structure of how the data in the report (108) is presented. For example, a dimension may represent a column of a table, a row of a table, or other structural elements of the report.

A dimension is characterized by one or more cells. A cell is a specific storage bin for a defined information type. For example, a cell may be the intersection of a row and a column in a table. A cell may be a particular logical entry within a given dimension (e.g., an entry in a column). Thus, the Dimension A (130) may have Cell A (134) and Cell B (136), and Dimension B (132) may have Cell A (134) and Cell B (136). More or fewer cells may be present for each dimension, though each dimension has at least once cell.

Thus, the report (108), when displayed to a user, is populated cells of the dimensions. As described more with respect to FIG. 2, the cells of the dimensions of the report (108) are populated by traversing the tree (106).

Note that the cells of the dimensions of the report (108) need not be a mere re-presentation of the fields in the dataset (102). For example, the Cell A (134) could be an aggregation of values of the Field A (116) and the Field B (118). The Cell A (134) could represent a grouping of the Subset Node A (126) and the Subset Node B (128). Thus, the report (108) is not limited to merely reformatting the information in the dataset (102).

The system shown in FIG. 1 also includes other components, in addition to the data repository (100). For example, the computing system also includes a bus (142). The bus (142) is a physical (wired or wireless) connection (such as a network) and/or is a logical relationship between software systems. For example, the bus (142) may be a logical relationship between software, such as the report generation engine (144), and/or may be a physical relationship between a data repository (100) and the display device (146). Along the bus (142) may also be a data source (110) with a dataset (102), which are external to the data repository (100).

The report generation engine (144) is software or application specific hardware/firmware that, when executed, generates the report (108). The report generation engine (144) is programmed using the DSL described with respect to FIG. 3 through FIG. 8, and with particular reference to FIG. 7A.

The display device (146) is a monitor, television, screen, projector, hologram generator, or other physical device used to display information. In particular, the display device (146) is used to display the report (108). When displayed, the report (108) may be referred-to as a displayed report (148).

The data source (110) is a body of data related to a topic and is commonly stored external to the data repository (100) and includes the dataset (102). For example, the data source (110) may be a series of electronics records of transactions stored by a business. In another example, the data source (110) could be measurement data relating to a scientific experiment.

In one or more embodiments, the dataset (102) is defined as data taken from data source (110). The dataset (102) is characterized as being composed of multiple records. Each record is associated with one or more fields. Thus, the dataset (102) includes, for example, Record A (112) and Record B (114). Each of the Record A (112) and the Record B (114) is defined as a subset of the data source (110) that relates to a logically associated information. For example, the Record A (112) may relate to a first transaction and the Record B (114) may relate to a second transaction. In turn, each of the Field A (116) and the Field B (118) is defined as a particular entry in the corresponding record. Thus, for example, the Field A (116) may be a specific entry in the Record A (112), and likewise the Field B (118) may be another specific entry in the Record B (114).

Note, however, that in some cases a record may have multiple fields. Thus, for example, in one embodiment, the Field A (116) and the Field B (118) may both be fields associated with one of the Record A (112), the Record B (114), or both. Accordingly, it is not necessarily the case that the Field A (116) is always associated with the Record A (112) or that the Field B (118) is associated with the Record B (114).

While FIG. 1 shows a configuration of components, other configurations may be used without departing from the scope of the one or more embodiments. For example, various components may be combined to create a single component. As another example, the functionality performed by a single component may be performed by two or more components.

Figure 2:
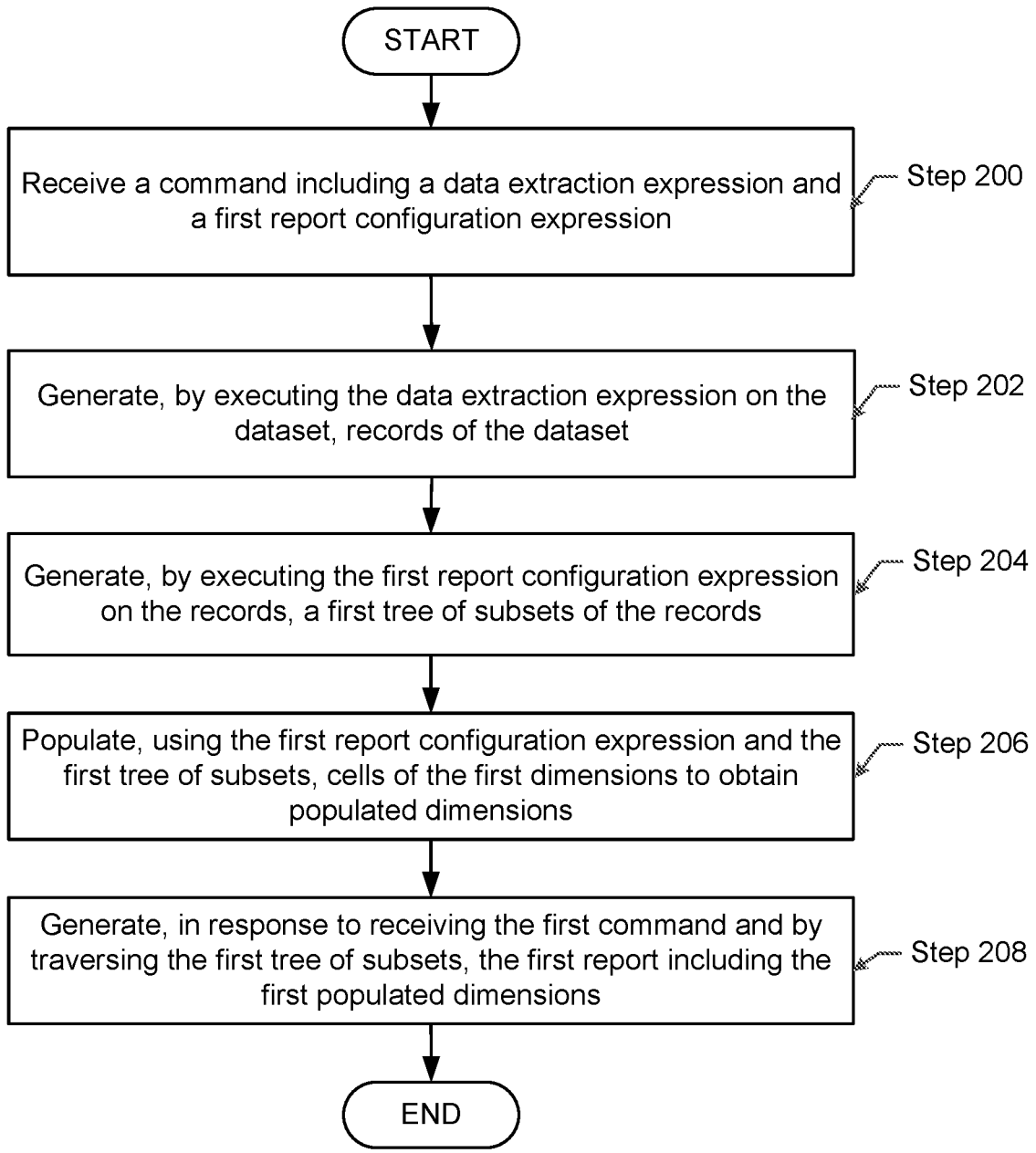
FIG. 2 shows a method for automatically generating a report, in accordance with one or more embodiments of the one or more embodiments.

FIG. 2 shows a method for automatically generating a report, in accordance with one or more embodiments. The method of FIG. 2 may be performed using the computing system described with respect to FIG. 1. The method of FIG. 2 may also be performed on the computing system shown with respect to FIG. 9A and FIG. 9B. With respect to FIG. 2, ordinal terms such as "first," "second," etc. indicate the possible presence of additional related terms, though at a minimum at least one such term exists. A specific example of the method of FIG. 2 is described with respect to FIG. 3 through FIG. 8.

Step 200 includes receiving a command including a data extraction expression and a first report configuration expression. The data extraction expression is applied to one or more fields of the data set of the data source. In other words, the processor applies the code specified in the data extraction expression to the one or more fields in the data set. In doing so, the data is extracted. Extracted data is then held in memory before sorting the data in the further steps of the method of FIG. 2.

In turn, the command also included the first report configuration expression. The first report configuration expression is applied to one or more dimensions of a first report. In other words, the processor applies the code specified in the data extraction expression to one or more dimensions of the first report. In doing so, the computer configures the dimensions and overall structure of the report. Stated in the vernacular, the report configuration expression is the code that instructs the computer to structure a custom report to have the shape and dimensions requested by the user.

Note that the first command may have other expressions. For example, the first command my indicate expressions for highlighting the report, expressions for aggregating data, expressions for grouping data, etc.

Step 202 includes generating, by executing the data extraction expression on the dataset, records of the dataset. Executing the data extraction expression means executing the code and applying the commands to the dataset. The result of execution is generation of the records of the dataset.

Step 204 includes generating, by executing the first report configuration expression on the records, a first tree of subsets of the records. Executing the first report configuration expression means executing the code and applying the commands to the records of the data set. Stated differently, the report configuration expression, when applied to the records, generates the first tree. Stated still differently, the report configuration expression generates a tree of subsets of records, the records having been sorted, aggregated, and/or grouped into the subsets according to the commands in the first report configuration expression.

Step 206 includes populating, using the first report configuration expression and the first tree of subsets, cells of the first dimensions to obtain first populated dimensions. Again, the first report configuration expression is being used to further refine the structure and contents of the report. In step 206, the cells of the dimensions are populated with data. The data populating the dimensions are the records as sorted, aggregated, and/or grouped.

Step 208 includes generating, in response to receiving the first command and by traversing the first tree of subsets, the first report including the first populated dimensions. Once the report has been configured, the report is generated and includes the dimensions populated with the information specified by the first report configuration. The data includes the data extracted by the extraction expression, and thus may be the fields of the records, or aggregation, grouping, or other configurations of the fields of the records.

With respect to traversing the first tree of subsets, the computer goes through the tree starting at the root node. Each sub node is checked for information specified by the data extraction expression and the first report configuration expression. The information of interest is retrieved, manipulated as specified by the first report configuration expression, and then used to populate the dimensions of the report. In this manner, the first report is generated by traversing the tree of subsets.

In any case, once generated, the report may be presented on a display device. The report includes at least values of a first field among the fields of the records. However, in most cases, the report includes values of multiple fields of multiple records, arranged in a new manner as specified by the user.

The method of FIG. 2 may be varied. For example, executing the first report configuration expression may include dividing the records into the first tree using values of a first subset of the fields. In other words, the records are sorted into leave nodes of the tree. An example of this procedure is described with respect to FIG. 6.

In another example, populating the cells of the first dimensions includes aggregating, in the first tree of subsets, values of the first subset of the fields. In other words, the cells (entries) of the dimensions (columns or rows) includes aggregating (adding, collating, or similar forms of aggregation) the values of the records into the first tree of records.

In an embodiment, a correctness criterion may be applied as part of the first report configuration expression. The correctness criterion is one or more numbers or one or more rules and/or policies that may be used to evaluate whether a report is deemed correct. For example, rules or policies may indicate that a particular report is incorrect if the report is missing certain dimensions. In a specific example, a profit and loss statement might be required to include a profit statement and, if missing, the report does not meet the correctness criterion.

In this case, if the report fails to satisfy the correctness criterion, further action may be taken. For example, the repot configuration expression may be modified in some manner in order to satisfy the correctness criterion. For example, the report configuration expression may be modified to include the required dimension (e.g. the profit statement). The report configuration expression is then re-executed in order to generate a new report that does satisfy the correctness criterion.

The method of FIG. 2 may be further expanded with respect to using other commands to the dataset. For example, the method may also include receiving a second command. The second command includes the data extraction expression applied to the plurality of fields of the dataset of the data source, and a second report configuration expression applied to a second plurality of dimensions of a second report. The expanded method then includes generating, by executing the second report configuration expression on the plurality of records, a second tree of subsets. The expanded method then includes populating, using the second report configuration expression and the second tree, a plurality of cells of the second plurality of dimensions to obtain a second plurality of populated dimensions. The expanded method then includes generating, in response to receiving the second command and by traversing the second tree, the second report including the second plurality of populated dimensions.

Stated differently, the one or more embodiments contemplate generating multiple different reports having different configurations, although the underlying dataset is the same. Examples of multiple different reports that can be generated in this manner are shown with respect to FIG. 7B and FIG. 8.

Figure 6:
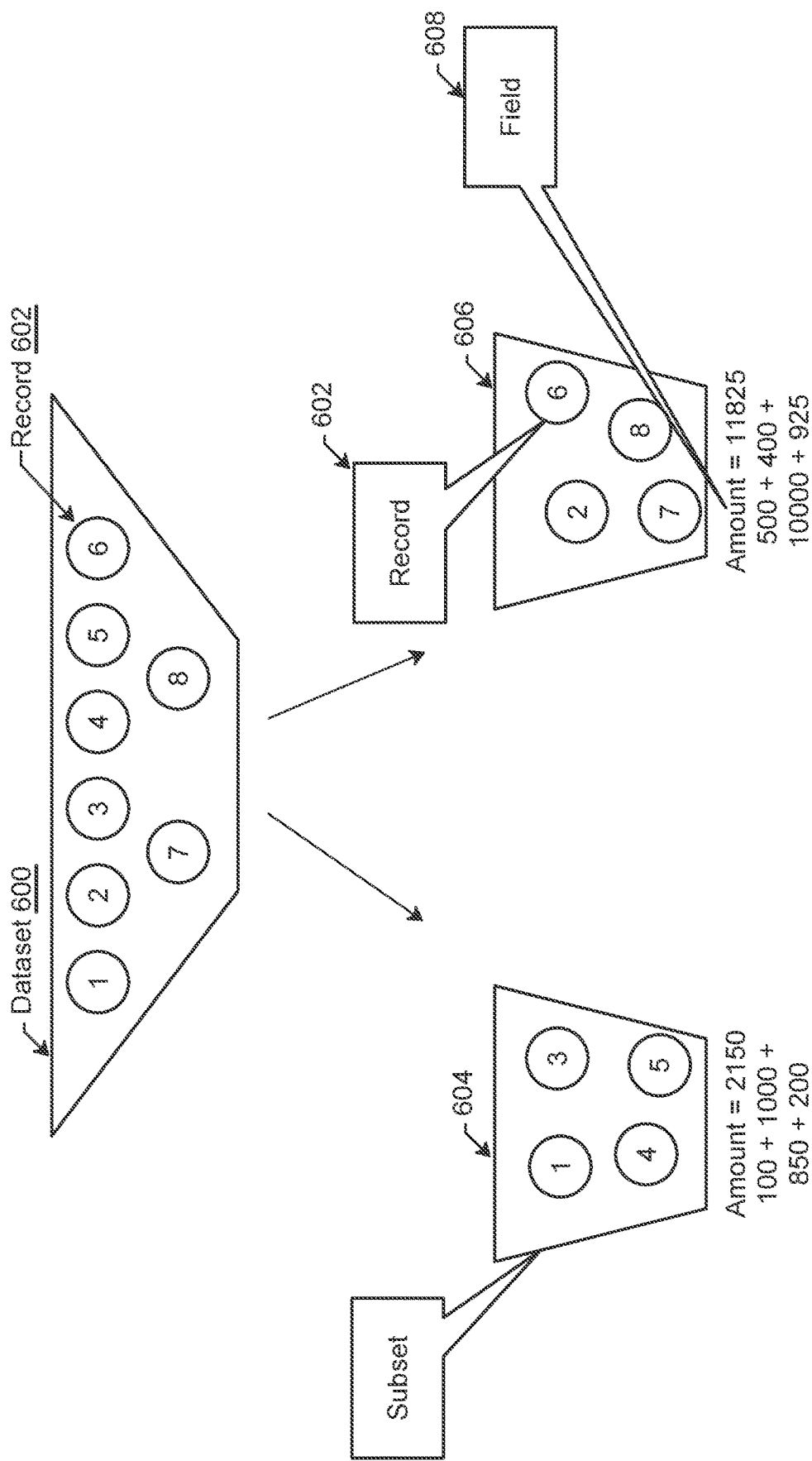

In another variation to the method of FIG. 2, the first report configuration expression defines a first field external to the fields. In another words, a new field is defined by the report configuration expression. In this case, a value extraction expression assigns values to the first field in the records. The, the first report configuration expression may include another command to divide the records into the first tree using values of the first field. An example of this procedure is shown in FIG. 6.

Figure 5:
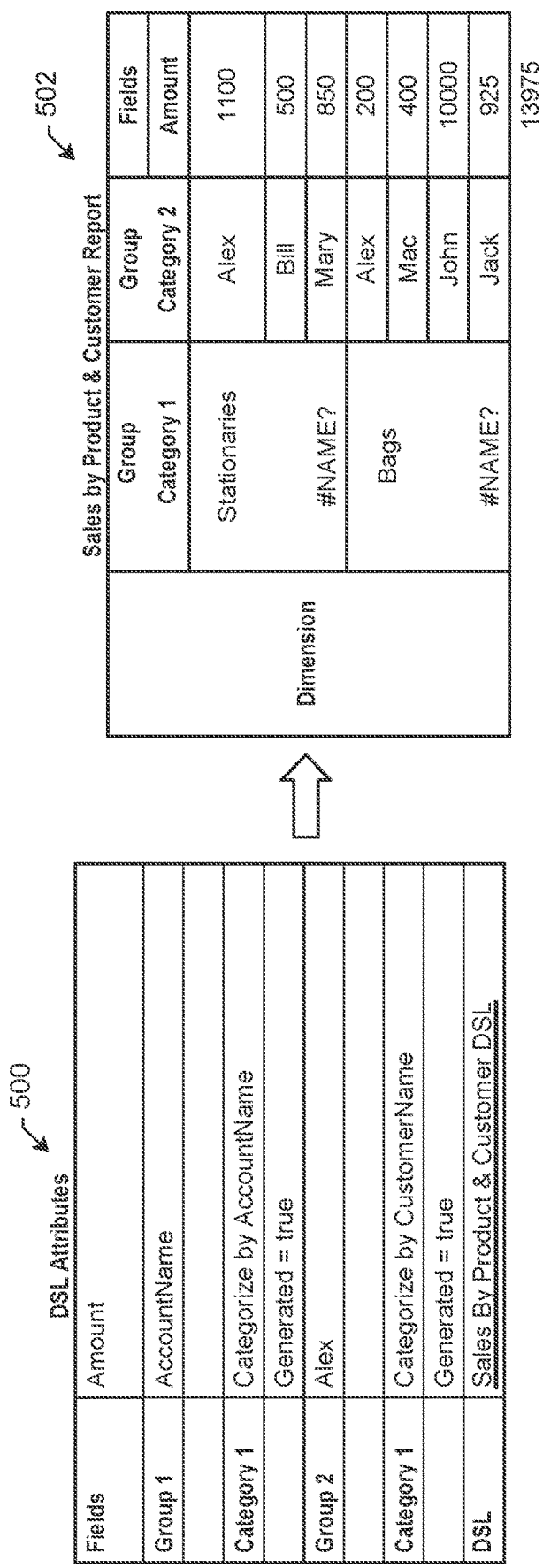

Still other variations are possible. For example, if the data is not already available, the computer may automatically obtain the source data responsive to receiving the first command. Obtaining the source data may include receiving the source data sent from an external source or actively retrieving the source data. The report may be displayed on a display device. The displayed report may be further modified, such as highlighting one or more of the dimensions or by highlighting certain fields or subsets in the report. An example of highlighting is shown in FIG. 4, FIG. 5, and FIG. 7B.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 3 through FIG. 8 present a specific example of the techniques described above with respect to FIG. 1 and FIG. 2. The following example is for explanatory purposes only and not intended to limit the scope of the one or more embodiments. FIG. 7A, in particular, shows details of the DSL, which may be used to express the first report configuration expression in a manner that imposes a hierarchical structure on data retrieved in the SQL.

FIG. 3 shows a table (300) of data. The table (300) is an example of the data source (110) described with respect to FIG. 1. In this specific example, the table (300) is formed from columns (dimensions) of data. The values (fields) of the columns (dimensions) specify data entries. Each row represents a single record.

Thus, for example, row (302) constitutes one of eight records in the table (300). The row includes five columns (dimensions). The cells are the intersections of the rows and the columns. Specifically shown are a "TXN ID" (transaction identifier), a date, an account name associated with the transaction, a customer name associated with the transaction, and an amount associated with the transaction.

FIG. 4 shows the DSL attributes used to create an account summary report. In this example, the user desires a report that summarizes the accounts by account name and the total dollar amount of all transactions for a given account name. As can be seen from FIG. 3, this information must be gathered, tallied, and/or collated, not merely reported from the raw information expressed in the data sources that is the table (300) in FIG. 3.

The DSL attributes (400) specify the fields (the amounts), and the grouping (account name), the category (by account name). The DSL type shown at arrow (402) indicates the type of report that will be generated with the specified DSL attributes. The result of applying the DSL configuration is the account summary report (404) shown on the right of FIG. 4.

As can be seen in FIG. 4, the dimensions (columns) are the "group category" and the "fields amount," which represents the aggregated dollar amounts of all transactions in the specified group category. When the data extraction expression and the report configuration expression are applied as described with respect to FIG. 2, the result is an account summary report (404). Note that the user could not have otherwise obtained the account summary report (404) using SQL commands, because the hierarchy of the data relationships required for such a report cannot be expressed in SQL. Note further that a specific example of the DSL language, including the report configuration expression is described with respect to FIG. 7B.

To demonstrate the flexibility of the one or more embodiments, FIG. 5 presents another report that can be automatically configured from the data source shown in table (300) using the DSL. In this case, the DSL attributes (500) specify the attributes described with respect to FIG. 4, but now also specify a second group that further split the first category group into a second category group. More particularly, the first group category is the account names (expressed in one dimension (column)) and the first group category is further separated into a second group category by customer name (expressed in a second dimension (column)). In other words, within a given account name, the user wants to know how much money over multiple transactions has been received from each named customer. Thus, for example, the user can see that Alex purchased a total of $1000 in stationaries and a total of $200 in bags.

FIG. 5 reinforces the hierarchical structures possible using the DSL. SQL could not return table (502), because SQL lacks the means to dynamically generate the hierarchical relationships between the first group (stationaries) and the second group (customer names) and then aggregate the dollar amounts according to the required category and sub-category.

FIG. 6 shows an example of a tree of subsets, as described with respect to FIG. 1 and FIG. 2. Dataset (600) includes several records represented by the circled numbers in FIG. 6, including record (602). The DSL, through the report configuration expression, can be used to establish the tree data structure. The dataset (600) is the root node of the tree. The first two leaves of the tree include a first subset (604) and a second subset (606). Each subset includes some of the records of the dataset (600). Thus, for example, different circled numbers can be seen in the first subset (604) and the second subset (606).

Various fields of the records in each subset can then be manipulated. For example, the field (608) shown under the second subset (606) shows the total amount of all transactions for the records contained within the second subset (606). The individual dollar amounts refer back to the table (300) in FIG. 3 for reference.

The tree shown in FIG. 6 can be traversed to find information of interest. For example, the record (602) is found in the dataset (600), and then again in the second subset (606). By traversing the tree, the hierarchical structure of the records (expressed using the DSL) can be ascertained. Additionally, the values of the cells of the dimensions of the report can be populated using the tree shown in FIG. 6. For example, the total dollar amount of the records in the second subset (606) can be aggerated in order to report the desired information. The tree allows the computer to recognize that records represented by circled numbers "2," "6," "7," and "8" are to be considered together in one category. The information is then presented in the report accordingly, such as shown in FIG. 4 and FIG. 5.

Attention is now turned to FIG. 7A. FIG. 7A shows a code snippet in the DSL. The code snippet shows highly specific examples the report configuration expression and the data extraction expression as described with respect to FIG. 1 and FIG. 2.

The data extraction expression is shown between the lines indicated at reference numeral (700). The data sources, data sets, and fields are specified. The ellipsis in brackets indicates the actual sources of the data sources, data sets, and fields. The code between the lines at reference numeral (700) thus allows the computer to find the necessary data and then apply the extraction command to the fields of the dataset of the data source.

The report configuration expression is shown between the lines indicated at reference numeral (702). The lines of code within the report configuration expression can be applied to the specified dimensions of one or more reports within the dataset. The report configuration expression also specifies commands useable to generate the tree of the subsets of the records, to populate the cells of the dimensions, and to generate the report by traversing the generated tree.

A specific code, the "$SELF" noted in line (704) of FIG. 7A, empowers the DSL programmer to start accessing and manipulating subsets. The "SELF" refers to one of the subsets, and the "$" indicates that a reference is to be made to a subset.

By using the "$" command in DSL, the hierarchy (that SQL cannot dynamically generate) can be provided. The subsets can be constructed by dividing the records via the data extraction expression at reference numeral 700. The query results (of the data extraction expression) are further divided as desired to achieve the hierarchical relationships among the records and the fields. More and more subsets can be generated to create the tree until the number of layers of relationships is achieved that allow a report to be created with the information arranged according to the user's request. Thus, the DSL shown in FIG. 7A can be used to generate many different kinds of reports in many different structures and arrangements, all from the same underlying data, but without requiring the user to provide the programming that would otherwise be necessary to structure the data as desired.

For this reason, the one or more embodiments may be referred to as a "universal report engine," as a user can specify the type of report desired and then the DSL language can be automatically generated and executed to achieve the user's desired report structure. Because the report structure need not be pre-specified or arranged, any report structure is possible; hence, the term "universal" report engine.

Note that the code shown in FIG. 7A is exemplary only. The code shown in FIG. 7A is expected to be varied. In particular, the code may be generated, and executed, in real time every time a user requests a new report structure.

To show the relationship between the code snippet in FIG. 7A and the report that is generated, attention is now turned to FIG. 7B. The source data (706) is another group of records including five columns of information. In this case, the user desires to see the amount of money generated from each transaction type, but further sub-divided by customer. The code snippet shown in FIG. 7A establishes the hierarchy of data between the transaction type and the customers and the dollar amounts. The generated tree creates the subsets (e.g., buckets) of data and their relationships. Stated differently, the root node includes all of the records and the code generates the hierarchy of subsets of records (e.g., buckets). Thus, for example, the root node may be the two transaction types (income and expense). The leaf nodes, off of each root node, are the customers that are contained within the root node of transaction type. Note that the same customer may appear in both transaction types, because in come cases one customer may have multiple transactions that include both transaction types. In each case, once the hierarchical arrangement between the transaction types and the customers are specified by the DSL, the amount of money of all transactions that fit a particular variation (e.g., the "income" transaction type for customer "Alex") can be retrieved, aggregated, and then populated into the amount column.

Note again, this dynamic generation procedure is not possible in SQL. Rather, an expert programmer would have to provide the programming language needed to arrange the report as shown. However, with the DSL as invented and described herein and shown in FIG. 7A, all the user has to do is specify the type of data desired in the arrangement desired, and the code for generating the hierarchical arrangement can be automatically generated and expressed using only the user's input as the basis for the lines of code. For example, rules and policies can retrieve individual code snippets that correspond to the hierarchical structure being requested by the user, and the code shown in FIG. 7A can be generated automatically. In this manner, the user can see any report that the user desires based on the underlying data, but without having the expert programming knowledge otherwise required to generate and display the desired report.

To state a distinction between DSL and SQL, DSL has the capability to express data in a hierarchical fashion automatically. An attempt at hierarchical reporting using SQL requires that the hierarchy be defined externally, because dynamically generating the hierarchy at runtime in SQL is not possible. In contrast, the DSL generates the hierarchy of subsets (e.g., buckets) dynamically, at runtime, as queries are executed, and as the report configuration expression is applied to the query results. The hierarchy is incrementally generated as "leaf" subsets are rolled up into larger subsets (e.g., zip code data to city data).

FIG. 8 shows another example of the type of report that can be generated using system shown in FIG. 1, the method shown in FIG. 2, and the code snippet shown in FIG. 7A. FIG. 8 again highlights the flexibility of the DSL and the hierarchical reporting capabilities of the one or more embodiments. The report (800) of FIG. 8 could not be expressed using SQL alone, without providing an external hierarchy imposed on the SQL.

The report (800) is a profit and loss statement. Each subcategory within a category (e.g., "billable expense income" within "revenue") is expressed as one of the subsets within the tree hierarchy generated using the DSL, as described with respect to FIG. 7A. The other categories, such as total revenue, total cost of sales, total expenses, net operating income, and overall net income are each generated by traversing the tree and obtaining the information needed to report the specified category. Because the DSL has expressed the hierarchy needed to generate the report, the dollar information for each of the categories (subsets) can be retrieved and aggregated as desired to obtain the specific report desired by the user.

Note, in this case, SQL and DSL may be complementary. The DSL shown in FIG. 7A can be used to generate the hierarchy, and then SQL expressions can be used to retrieve the specific entries of the desired data using the hierarchy generated by DSL. Once the entries are retrieved, the data can be aggregated and then placed in the appropriate field of the desired report.

Figure 9A:
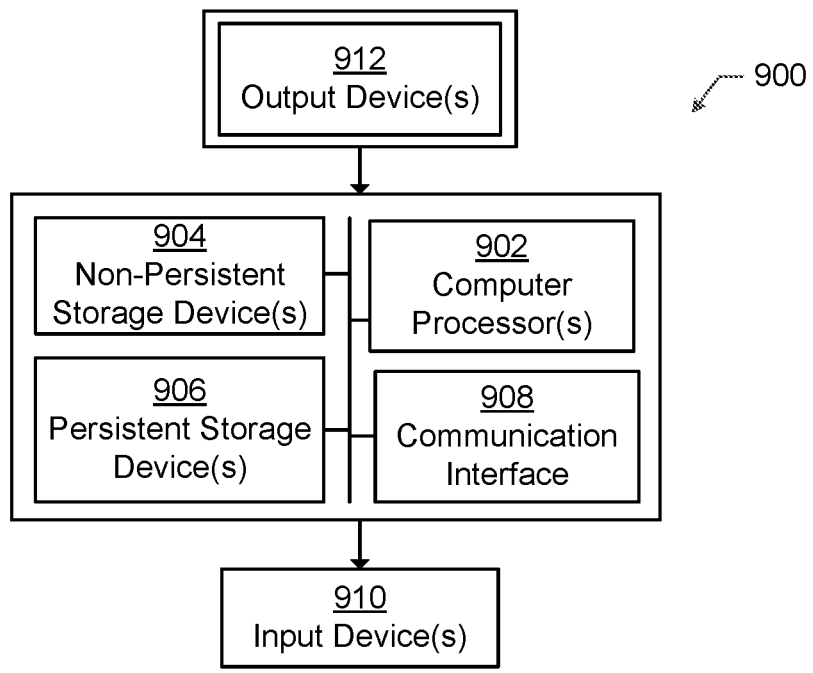
FIG. 9A and FIG. 9B show examples of a computing system and a network, in accordance with one or more embodiments
Figure 9B:
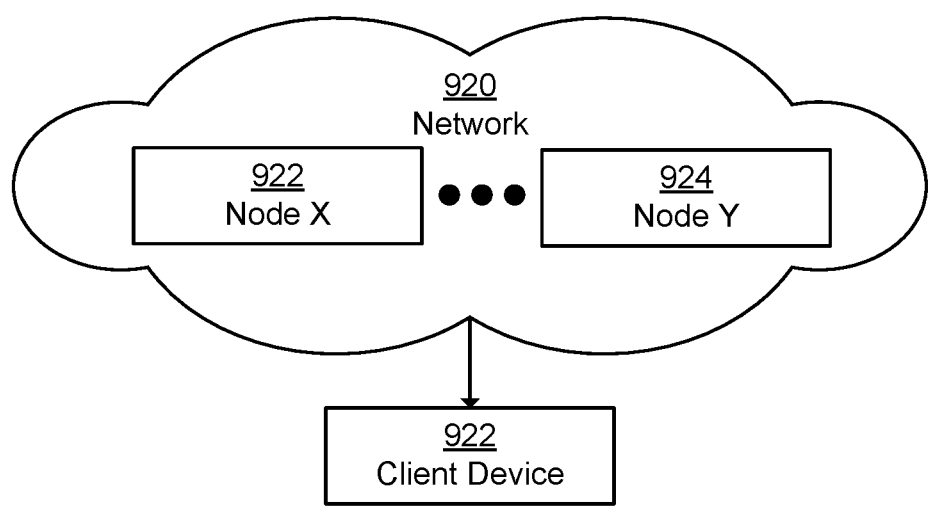

FIG. 9A and FIG. 9B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display device), a printer, an external storage, or any other output device. One or more of the output device(s) (912) may be the same or different from the input device(s) (910). The input and output device(s) (910 and 912) may be locally or remotely connected to the computer processor(s) (902), the non-persistent storage device(s) (904), and the persistent storage device(s) (906). Many different types of computing systems exist, and the aforementioned input and output device(s) (910 and 912) may take other forms.

Software instructions in the form of computer readable program code to perform of the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or a group of nodes combined may correspond to the computing system (900) shown in FIG. 9A. By way of an example, the one or more embodiments may be implemented on a node of a distributed system that is connected to other nodes. By way of another example, the one or more embodiments may be implemented on a distributed computing system having multiple nodes, where each portion one or more embodiments may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of one or more embodiments.

The computing system (900) or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as extensible Markup Language (XML)).

The extracted data may be used for further processing by the computing system. For example, the computing system (900) of FIG. 9A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A-B), and the status flags may be read to determine if the result is positive (i.e., if A>B, then A-B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
   receiving a first command comprising a single set of computer executable program code, wherein:
      the single set of computer executable program code includes both a data extraction expression and a first report configuration expression,
      the data extraction expression comprises program code, within the single set of computer executable program code, which when executed by a processor is configured to extract a plurality of fields of a dataset of a data source, and
      the first report configuration expression comprises program code, within the single set of computer executable program code, which when executed by the processor is configured to populate a plurality of cells of a first plurality of dimensions of a first report and to generate a first tree comprising a plurality of subset nodes comprising a plurality of records of the dataset; and
   executing the first command by:
      executing the data extraction expression on the dataset to generate the plurality of records;
      executing the first report configuration expression on the plurality of records to generate the first tree;
      populating, using the first report configuration expression and the first tree, the plurality of cells; and
      generating, in response to receiving the first command and by traversing the first tree, the first report.

2. The method of claim 1, wherein:
   the first report configuration expression further specifies a configuration of the first report, and
   generating the first report further comprises configuring the first report according to the first report configuration expression.

3. The method of claim 1, wherein executing the first report configuration expression comprises dividing the plurality of records into the first tree using values of a first subset of the plurality of fields.

4. The method of claim 3, wherein populating the plurality of cells of the first plurality of dimensions comprises aggregating, in the first tree of subsets, values of the first subset of the plurality of fields.

5. The method of claim 4, further comprising:
   presenting, in a display device, the first report comprising at least values of a first field of the plurality of fields.

6. The method of claim 1, wherein the first report corresponds to a correctness criterion, and further comprises:
   determining that the first report fails to satisfy the correctness criterion; and
   modifying the first report configuration expression to satisfy the correctness criterion.

7. The method of claim 1, further comprising:
   receiving a second command comprising the data extraction expression applied to the plurality of fields of the dataset of the data source, and a second report configuration expression applied to a second plurality of dimensions of a second report;
   generating, by executing the second report configuration expression on the plurality of records, a second tree comprising a second plurality of subset nodes comprising a second plurality of records of the dataset;
   populating, using the second report configuration expression and the second tree, a plurality of cells of the second plurality of dimensions to obtain a second plurality of populated dimensions; and
   generating, in response to receiving the second command and by traversing the second tree, the second report comprising the second plurality of populated dimensions.

8. The method of claim 1, wherein:
   the first report configuration expression defines a first field external to the plurality of fields, and a value extraction expression that assigns values to the first field in the plurality of records, and
   executing the first report configuration expression comprises dividing the plurality of records into the first tree using values of the first field.

9. The method of claim 1, further comprising:
   obtaining the dataset from the data source responsive to receiving the first command.

10. The method of claim 1, further comprising:
    displaying a displayed report on a display device, wherein the displayed report comprises the first report.

11. The method of claim 9, further comprising:
    highlighting one or more of the first plurality of dimensions.

12. A non-transitory computer readable storage medium storing a data structure and computer executable program code, which when executed by a processor performs operations to generate a report using the data structure, comprising:
    wherein the data structure comprising:
       a dataset comprising a plurality of records;
       a command comprising a single set of computer executable program code, wherein:
          the single set of computer executable program code includes both a data extraction expression and a first report configuration expression,
          the data extraction expression comprises program code, within the single set of computer executable program code, which when executed by the processor is configured to extract a plurality of fields of a dataset of a data source, and
          the first report configuration expression comprises program code, within the single set of computer executable program code, which when executed by the processor is configured to populate a plurality of cells of a first plurality of dimensions of a first report and to generate a first tree comprising a plurality of subset nodes comprising a plurality of records of the dataset;
       a first tree comprising a root node and a first plurality of nodes extended from the root node and corresponding to a first plurality of subsets of the plurality of records, wherein the root node corresponds to the plurality of records of the dataset; and wherein the stored computer executable program code, in the non-transitory computer readable storage medium, comprising:
program code for generating the first plurality of subsets by executing a data extraction expression applied to a plurality of fields of the dataset;
program code for generating a first plurality of populated dimensions by populating, using the first report configuration expression and the first tree, a first plurality of cells of a first plurality of dimensions defined by the first report configuration expression; and
program code for generating a first report comprising the first plurality of populated dimensions in response to receiving the command and by traversing the first tree.

13. The non-transitory computer readable storage medium of claim 12, wherein the data structure further comprising: the first report configuration expression further specifies a configuration of the first report.

14. The non-transitory computer readable storage medium of claim 12, wherein the data structure further comprising:
a second plurality of nodes extending from the root node and corresponding to a second plurality of subsets of the plurality of records,
wherein the stored computer executable program code, in the non-transitory computer readable storage medium, further comprising:
program code for generating the second plurality of subsets by dividing the first plurality of subsets, according to the first report configuration expression, using values of a first field of the plurality of fields,
program code for generating a second plurality of populated dimensions by populating, using the first report configuration expression and the second plurality of subsets, a second plurality of cells of a second plurality of dimensions defined by the first report configuration expression; and
program code for generating a second report comprising the second plurality of populated dimensions by traversing the first tree.

15. The non-transitory computer readable storage medium of claim 12, wherein the stored computer executable program code, in the non-transitory computer readable storage medium, further comprising:
program code for populating the first plurality of cells of the first plurality of dimensions by: aggregating, in the first plurality of subsets, values of a first field of the plurality of fields, and a grouping of the first plurality of subsets using values of one or more of the first plurality of dimensions.

16. A non-transitory computer readable storage medium storing program code which, when executed by a processor, performs a computer-implemented algorithm, the computer-implemented algorithm comprising:
receiving a first command comprising a single set of computer executable program code, wherein:
the single set of computer executable program code includes both a data extraction expression and a first report configuration expression,
the data extraction expression comprises program code, within the single set of computer executable program code, which when executed by a processor is configured to extract a plurality of fields of a dataset of a data source, and
the first report configuration expression comprises program code, within the single set of computer executable program code, which when executed by the processor is configured to populate a plurality of cells of a first plurality of dimensions of a first report and to generate a first tree comprising a plurality of subset nodes comprising a plurality of records of the dataset; and
executing the first command by:
executing the data extraction expression on the dataset to generate the plurality of records;
executing the first report configuration expression on the plurality of records to generate the first tree;
populating, using the first report configuration expression and the first tree, the plurality of cells; and
generating, in response to receiving the first command and by traversing the first tree, the first report.

17. The non-transitory computer readable storage medium of claim 16, wherein, in the computer-implemented algorithm:
the first report configuration expression further specifies a configuration of the first report, and
generating the first report further comprises configuring the first report according to the first report configuration expression.

18. The non-transitory computer readable storage medium of claim 16, wherein, in the computer-implemented algorithm, executing the first report configuration expression comprises dividing the plurality of records into the first tree using values of a first subset of the plurality of fields.

19. The non-transitory computer readable storage medium of claim 18, wherein, in the computer-implemented algorithm, populating the plurality of cells of the first plurality of dimensions comprises aggregating, in the first tree of subsets, values of the first subset of the plurality of fields.

20. The non-transitory computer readable storage medium of claim 16, wherein, in the computer-implemented algorithm, the first report corresponds to a correctness criterion, and wherein the computer-implemented algorithm further comprises:
determining that the first report fails to satisfy the correctness criterion; and
modifying the first report configuration expression to satisfy the correctness criterion.

* * * * *